(12) United States Patent
Beck

(10) Patent No.: US 6,363,890 B1
(45) Date of Patent: Apr. 2, 2002

(54) PACKAGE FOR ANIMAL BEDDING PADS

(76) Inventor: Kenneth C. Beck, P.O. Box 8224, Cherry Hill, NJ (US) 08002

(*) Notice: Subject to any disclaimer, the term of this patent is extended or adjusted under 35 U.S.C. 154(b) by 183 days.

(21) Appl. No.: 09/035,655

(22) Filed: Mar. 6, 1998

(51) Int. Cl.[7] .......................... A01K 1/015; A01K 29/00
(52) U.S. Cl. ...................................... 119/526; 119/28.5
(58) Field of Search ............................... 119/526, 28.5, 119/169, 471, 171, 172, 174, 525; 53/425, 427, 432, 510, 511, 512, 434, 436, 426; 427/2.3; D24/126; 206/497, 204, 440, 449, 812; 383/109, 110

(56) References Cited

U.S. PATENT DOCUMENTS

| | | | |
|---|---|---|---|
| 2,779,465 A | * 1/1957 | Anderson | 427/2.3 |
| 2,834,459 A | * 5/1958 | Richard et al. | 206/440 |
| 2,840,080 A | * 6/1958 | Clark | 206/440 |
| 2,845,173 A | * 7/1958 | Langdon | 206/440 |
| 2,904,392 A | * 9/1959 | Pomerantz et al. | 53/427 |
| 2,938,766 A | * 5/1960 | Hall | 53/425 |
| 3,001,644 A | * 9/1961 | Fourness et al. | 206/440 |
| 3,062,371 A | * 11/1962 | Patience | 206/440 |
| 3,085,680 A | * 4/1963 | Evans et al. | 206/440 |
| 3,247,957 A | * 4/1966 | Kemble | 206/440 |
| 3,410,395 A | * 11/1968 | Sellers | 53/512 |
| 3,511,022 A | * 5/1970 | Finley et al. | 53/425 |
| 3,611,524 A | * 10/1971 | Broyles | 206/326 |
| 3,626,656 A | * 12/1971 | Langenscheidt | 206/326 |
| 3,626,899 A | * 12/1971 | Spellman | 119/171 |
| 3,641,732 A | * 2/1972 | Fujio | 53/512 |
| 3,716,961 A | * 2/1973 | Cope et al. | 53/425 |
| 3,848,597 A | * 11/1974 | Endres | 128/287 |
| 3,920,015 A | * 11/1975 | Wortham | 128/284 |
| 3,967,729 A | * 7/1976 | Tanner, II | 206/440 |
| 3,996,936 A | * 12/1976 | Widlund et al. | 128/287 |
| 4,022,324 A | * 5/1977 | Schuster | 206/439 |
| 4,040,424 A | * 8/1977 | Hunt | 128/290 R |
| 4,046,256 A | * 9/1977 | Congleton | 206/497 |
| 4,126,130 A | * 11/1978 | Cowden et al. | 128/91 R |
| 4,179,862 A | * 12/1979 | Landolt | 53/512 |
| 4,207,885 A | * 6/1980 | Hampton et al. | 128/156 |
| 4,307,717 A | * 12/1981 | Hymes et al. | 128/156 |
| 4,507,415 A | * 3/1985 | Kasai et al. | 524/101 |
| 4,545,177 A | 10/1985 | Day | 53/434 |
| 4,553,537 A | * 11/1985 | Rosenberg | 128/132 R |
| 4,555,022 A | * 11/1985 | Eagon et al. | 206/440 |
| 4,556,146 A | * 12/1985 | Swanson et al. | 206/440 |
| 4,577,591 A | * 3/1986 | Wesseldine | 119/143 |
| 4,625,679 A | 12/1986 | Hill | 119/1 |
| 4,655,209 A | * 4/1987 | Scott | 128/156 |
| 4,735,316 A | * 4/1988 | Froidh | 206/438 |
| 4,800,677 A | * 1/1989 | Mack | 119/1 |
| 4,813,210 A | * 3/1989 | Masuda et al. | 53/425 |
| 4,832,198 A | * 5/1989 | Alikhan | 206/438 |
| 4,837,062 A | * 6/1989 | Dunshee et al. | 428/41 |
| 4,839,233 A | * 6/1989 | Arena | 428/220 |
| 4,944,958 A | * 7/1990 | Langen et el. | 427/2 |
| 4,961,735 A | * 10/1990 | Siciliano | 604/378 |
| 4,998,620 A | * 3/1991 | Taylor | 206/440 |
| 5,014,494 A | * 5/1991 | George | 53/425 |
| 5,233,787 A | * 8/1993 | Andersen | 43/132.1 |

(List continued on next page.)

FOREIGN PATENT DOCUMENTS

| | | | |
|---|---|---|---|
| EP | 556547 A2 | * | 8/1993 |
| GB | 2043079 | * | 10/1980 |
| JP | 403168150 A | * | 7/1991 |
| JP | 403168151 A | * | 7/1991 |
| JP | 404049229 A | * | 2/1992 |
| JP | 409164204 A | * | 6/1997 |

*Primary Examiner*—Peter M. Poon
(74) *Attorney, Agent, or Firm*—Norman E. Lehrer

(57) ABSTRACT

A package for animal bedding which includes one or more pads or sheets of cotton within a plastic pouch is disclosed. The pads are placed within the pouch and the air from the interior of the pouch is evacuated. The pouch is then sealed. The package is also irradiated in order to provide sterile sheets to be used to line the bottom of animal cages.

9 Claims, 2 Drawing Sheets

U.S. PATENT DOCUMENTS 5,271,498 A * 12/1993 Gillespie .................... 206/326
5,630,376 A * 5/1997 Ochi et al. .................. 119/169
5,638,661 A * 6/1997 Banks ......................... 53/469
5,685,247 A * 11/1997 Hosselbarth ................ 112/440
5,685,257 A * 11/1997 Feibus ........................ 119/28.5
5,715,772 A * 2/1998 Kamrath et al. ............. 119/169
5,954,201 A * 9/1999 Finch et al. ................. 206/440
5,971,138 A * 10/1999 Soughan ...................... 206/210

* cited by examiner

PACKAGE FOR ANIMAL BEDDING PADS

BACKGROUND OF THE INVENTION

The present invention is directed toward a package for animal bedding pads and more particularly, toward a package which provides sterile, absorbent pads which may be used to line animal cages.

Animal bedding generally includes wood shavings or various pellets that line the bottom of an animal's cage. These pellets are usually available in paper or plastic bags sold in pounds. However, there are several problems with this type of bedding. For example, it must be frequently replaced; it retains odors; it is messy to clean and replace; and more of the pellets may be used to line the cage than may actually be needed.

Laboratories that house test animals find such bedding to be inconvenient and at times, inadequate for the intended use of the animals and observation of the same. As a result, the above-mentioned disadvantages create a waste of time and increase expenses.

Bedding in the form of a pad or sheet is more economical than the pellets when used in an experimental or clinical setting. These pads are usually made from cotton and provide a surface upon which the animal may scratch and eventually create a nest for itself. These pads are also easier and less time consuming to remove and replace. There is also a need, however, for the bedding to be sterile until it is used so that the laboratory animals are in a nearly sterile environment in order to obtain accurate test results. The pellets are packaged in such a way that sterility is not possible, nor is it necessary for the typical buyer of such pellets, namely, owners of pet hamsters, gerbils, and the like. Therefore, laboratories have special requirements regarding the bedding of the animals housed.

U.S. Pat. No. 4,625,679 to Hill discloses a bedding product for animals which includes cellulose pellets that are partially torn apart so as to produce a bedding product with increased surface area and absorption. However, these pellets are not in a sterile package and do not overcome the problems discussed above.

SUMMARY OF THE INVENTION

The present invention is designed to overcome the deficiencies of the prior art discussed above. It is an object of this invention to provide a package containing sterile, absorbent cotton pads which may be used to line the bottom of an animal cage.

It is a further object of the invention to provide the pads sealed in a plastic bag or pouch so that the interior of the bag is devoid of air, the package being irradiated once the pads have been sealed within the pouch.

In accordance with the illustrative embodiments, demonstrating features and advantages of the present invention, there is provided a sealed pouch filled with cotton pads which may be used to line the bottoms of animal cages. Once the pads are placed within the pouch, air is removed from the interior of the pouch, and the pouch is sealed. The entire package may then be irradiated.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
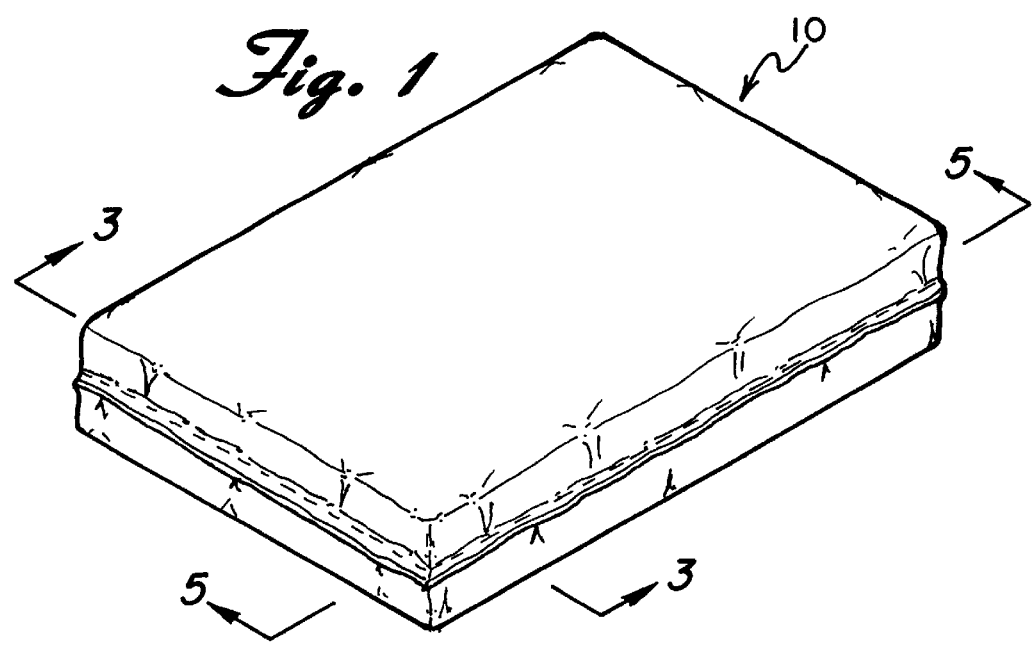
FIG. 1 is a front perspective view of the package of the present invention.

Referring now to the drawings in detail wherein like reference numerals have been used throughout the various figures to designate like elements, there is shown in FIG. 1 a package for animal bedding constructed in accordance with the principles of the present invention and designated generally as 10.

Figure 3:
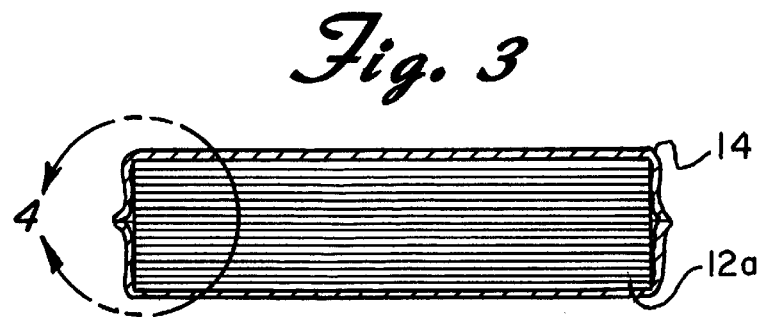
FIG. 3 is cross-sectional view taken through line 3—3 of FIG. 1.
Figure 4:
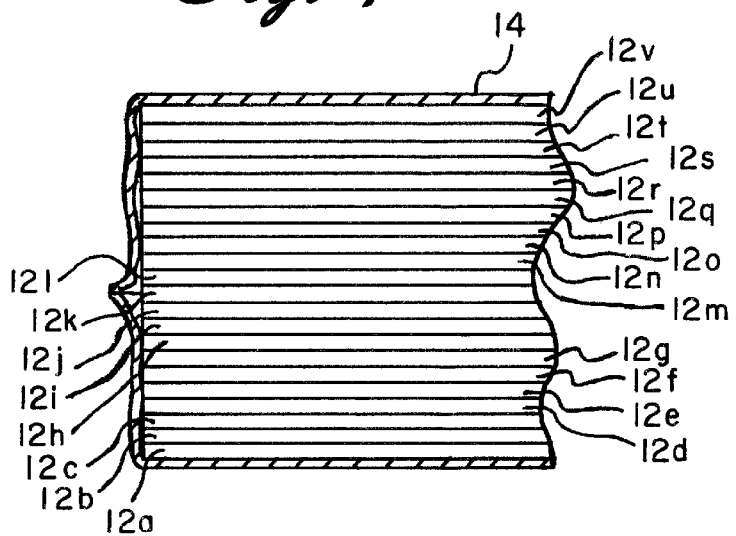
FIG. 4 is a partial, magnified view of section 4 of FIG. 3.
Figure 5:
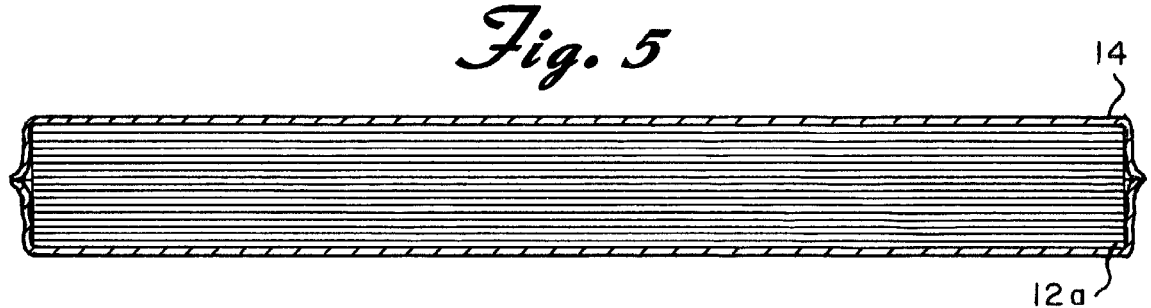
FIG. 5 is a cross-sectional view taken through line 5—5 of FIG. 1.

The package includes rigid, generally planar sheets or pads 12a–v, for example, and a plastic bag or pouch 14. The pads 12a–v are stacked within the pouch 14. (See FIG. 3.) Once the pads 12a–v have been placed within the pouch 14 air from the interior of the pouch is removed and the pouch is sealed by any method known in the art, as discussed below. For example, the pouch may be heat sealed. Once the pouch 14 has been sealed, it is then irradiated with cobalt. However, any irradiation technique known in the art may be used to sterilize the contents of the pouch 14. Thus, the pads 12a–v remain sterile until the pouch 14 is opened. However, it should be realized that the pouches need not be irradiated if to do so would be unnecessary.

As mentioned above, the pouch may be packaged in any manner well known in the art. For example, the pouch may be made from polyethylene non-shrink material. Air from the interior of the pouch is removed or evacuated by a vacuum pump. Next, the pouch is introduced to hot water where the pouch shrinks around the product being sealed. The pouch is then dried. Another method involves applying a vacuum to the interior of the pouch in order to remove all of the air within the pouch and introducing heat to the open end of the pouch in order to seal the same.

Figure 2:
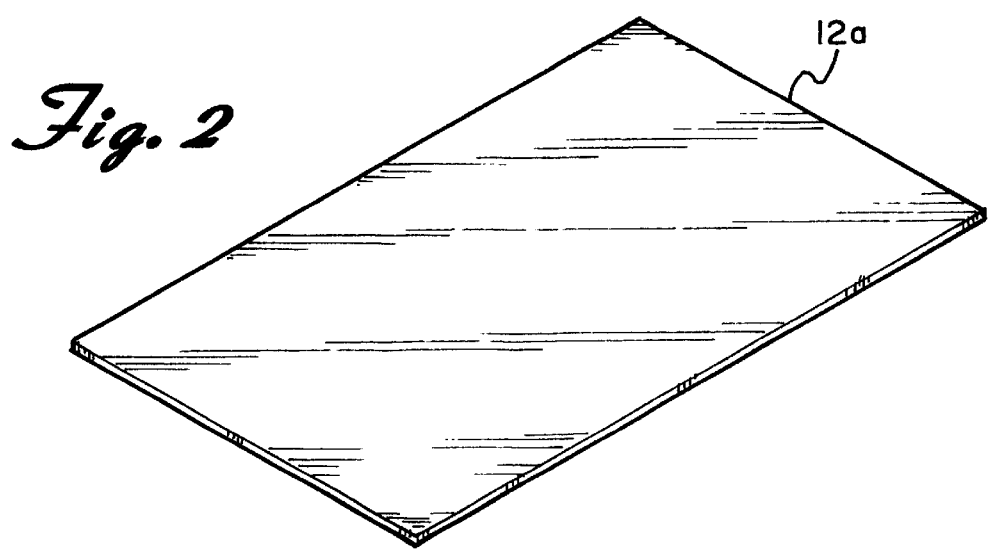
FIG. 2 is a front perspective view of one type of pad used in the present invention.
Figure 6:
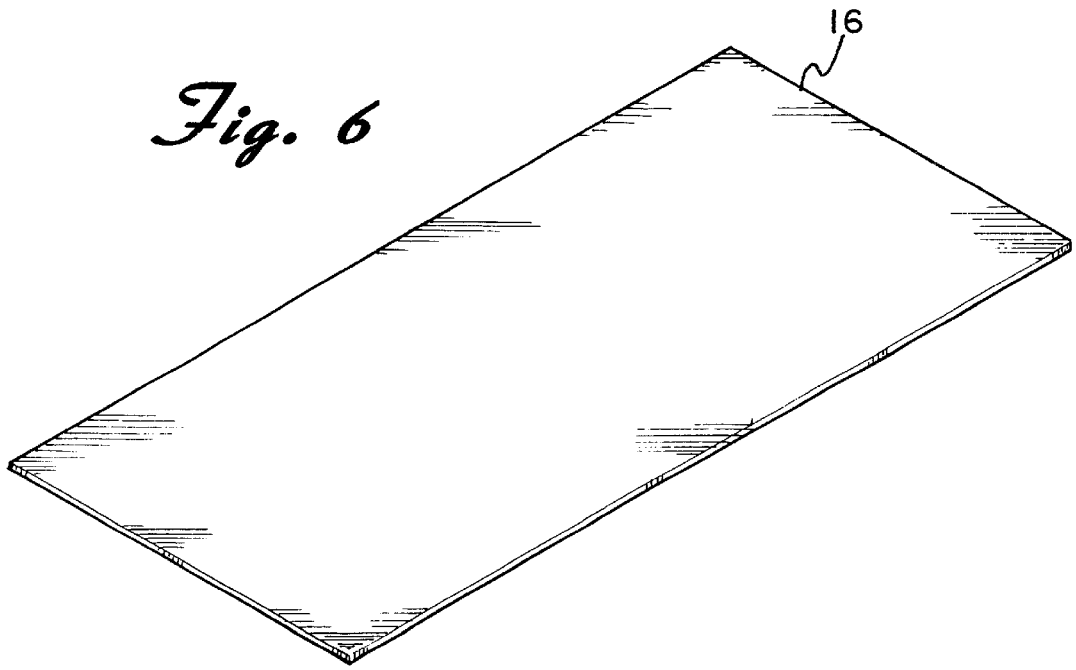
FIG. 6 is a front perspective view of an alternative type of pad used in the present invention.

The pads may vary in size, depending upon the intended use of the same. For example, pads 12a–v, represented as 12a in FIG. 2, each have a width of approximately six inches and a length of approximately ten inches and may be used to line the cages of mice. A larger pad 16 has a width of approximately eight inches and a length of approximately seventeen inches and may be used to line the cages of rats. (See FIG. 6.) The larger pads are placed in a pouch and are packaged in the same manner that the smaller pads 12a–v are packaged.

The pads are produced from cotton-based cellulosic fibers and, as a result, are hypoallergenic. They have a basis weight of approximately 200 pounds/ream or 702 g/m and a thickness of approximately 0.097 inches (2.46 mm). The material from which the pads are made are highly absorbent allowing them to absorb the animal waste and thereby keep the cage clean and odor-free. The controlled size eliminates waste that may be experienced with particulate beddings. Also, the pads are biodegradable and environmentally friendly. Any number of pads may be placed within a transparent or opaque pouch. Preferably, the pouches are made from plastic film material having a thickness of approximately 3 mil. However, a typical vacuum pouch known in the art may also be used.

In addition to the pads' primary function of serving as liners for animal cages, they may also be shredded by the animal in its cage to provide the animal with the natural enrichment to produce a nest-like environment. This also promotes an ideal atmosphere for rearing young. The pads are also ultra highly absorbent which encourages the evaporation of liquids. This allows the product to last longer and to continually absorb. The white color of the sheet is cosmetically appealing and is an asset to observation of animals and their discharges.

The present invention mat be embodied in other specific forms without departing from the spirit or essential attributes thereof and accordingly, reference should be made to the appended claims rather than to the foregoing specification as indicating the scope of the invention.

I claim:

1. A package for animal bedding comprising:
   at least one rigid, planar fibrous pad;
   a plastic pouch;
   said pad being located within said pouch, the interior of said pouch being substantially devoid of air, and said pouch being sealed;
   wherein said pad is sterile.

2. The package for animal bedding as claimed in claim 1 wherein said at least one pad is hypoallergenic.

3. The package for animal bedding as claimed in claim 1 further including a plurality of said pads.

4. The package for animal bedding as claimed in claim 1 wherein said at least one rigid, planar fibrous pad is cotton.

5. A method for packaging animal bedding comprising the steps of:
   providing at least one rigid, planar fibrous pad;
   providing a plastic pouch;
   placing said pad within said pouch, evacuating air from the interior of said pouch, sealing said pouch; and
   sterilizing the interior of said pouch and said pad.

6. The method for packaging animal bedding as claimed in claim 5 wherein said at least one pad is hypoallergenic.

7. The method for packaging animal bedding as claimed in claim 5 wherein said at least one rigid, planar fibrous pad is cotton.

8. The method for packaging animal bedding as claimed in claim 5 further including the step of providing a plurality of said pads.

9. The method for packaging animal bedding as claimed in claim 5 wherein the step of sterilizing the interior of said pouch and said pad includes irradiating said interior of said pouch and said pad.

* * * * *